United States Patent
Takada

(10) Patent No.: US 6,852,452 B2
(45) Date of Patent: Feb. 8, 2005

(54) METHOD OF FABRICATING HOLOGRAM SCREEN AND HOLOGRAM IMAGING APPARATUS

(75) Inventor: Kenichiro Takada, Kuwana (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 10/050,103

(22) Filed: Jan. 18, 2002

(65) Prior Publication Data

US 2002/0098419 A1 Jul. 25, 2002

(30) Foreign Application Priority Data

Jan. 22, 2001 (JP) ........................................ 2001-013706
Nov. 21, 2001 (JP) ........................................ 2001-356219

(51) Int. Cl.⁷ ................................................ G03H 1/02
(52) U.S. Cl. ............................ 430/1; 430/2; 359/28; 359/35; 359/10; 359/24; 359/25
(58) Field of Search ..................... 430/1, 2; 359/28, 359/23, 24, 25, 10, 35

(56) References Cited

U.S. PATENT DOCUMENTS

| | | | |
|---|---|---|---|
| 5,615,022 A | * 3/1997 | Brandstetter et al. | ......... 359/12 |
| 6,111,670 A | 8/2000 | Hattori et al. | ................. 359/15 |
| 6,163,390 A | * 12/2000 | Kanda et al. | ................. 359/28 |
| 6,421,147 B2 | * 7/2002 | Takada | ......................... 359/15 |
| 2001/0005317 A1 | * 6/2001 | Ori | ............................. 359/28 |

FOREIGN PATENT DOCUMENTS

| | | | |
|---|---|---|---|
| EP | 0 828 202 A2 | | 3/1998 |
| JP | 01-017084 | * | 1/1989 |
| JP | A-11-102153 | | 4/1999 |
| JP | 2000-029374 | * | 1/2000 |
| WO | WO 96/34322 | | 10/1996 |

* cited by examiner

Primary Examiner—Martin Angebranndt
(74) Attorney, Agent, or Firm—Posz & Bethards, PLC

(57) ABSTRACT

A method of fabricating a hologram screen having a large visual range and a hologram imaging apparatus used for the particular method of fabricating the hologram screen are disclosed. A plurality of mirrors (3) extended toward a plurality of photosensitive members (5) are arranged at a plurality of end portions (21), respectively, of a light diffuser (2). At least a reference beam (41) and object beams (42) passed through the light diffuser (2) are radiated on a plurality of the photosensitive members (5) individually thereby to form a plurality of holograms. These holograms are integrated with each other by being arranged two-dimensionally thereby to fabricate a hologram screen. Among the mirrors (3), a reference beam-side mirror (31) arranged nearer to the light source of the reference beams (41) is extended from the light diffuser (2) by a length varied with the position of the photosensitive member (5) to be exposed.

4 Claims, 15 Drawing Sheets

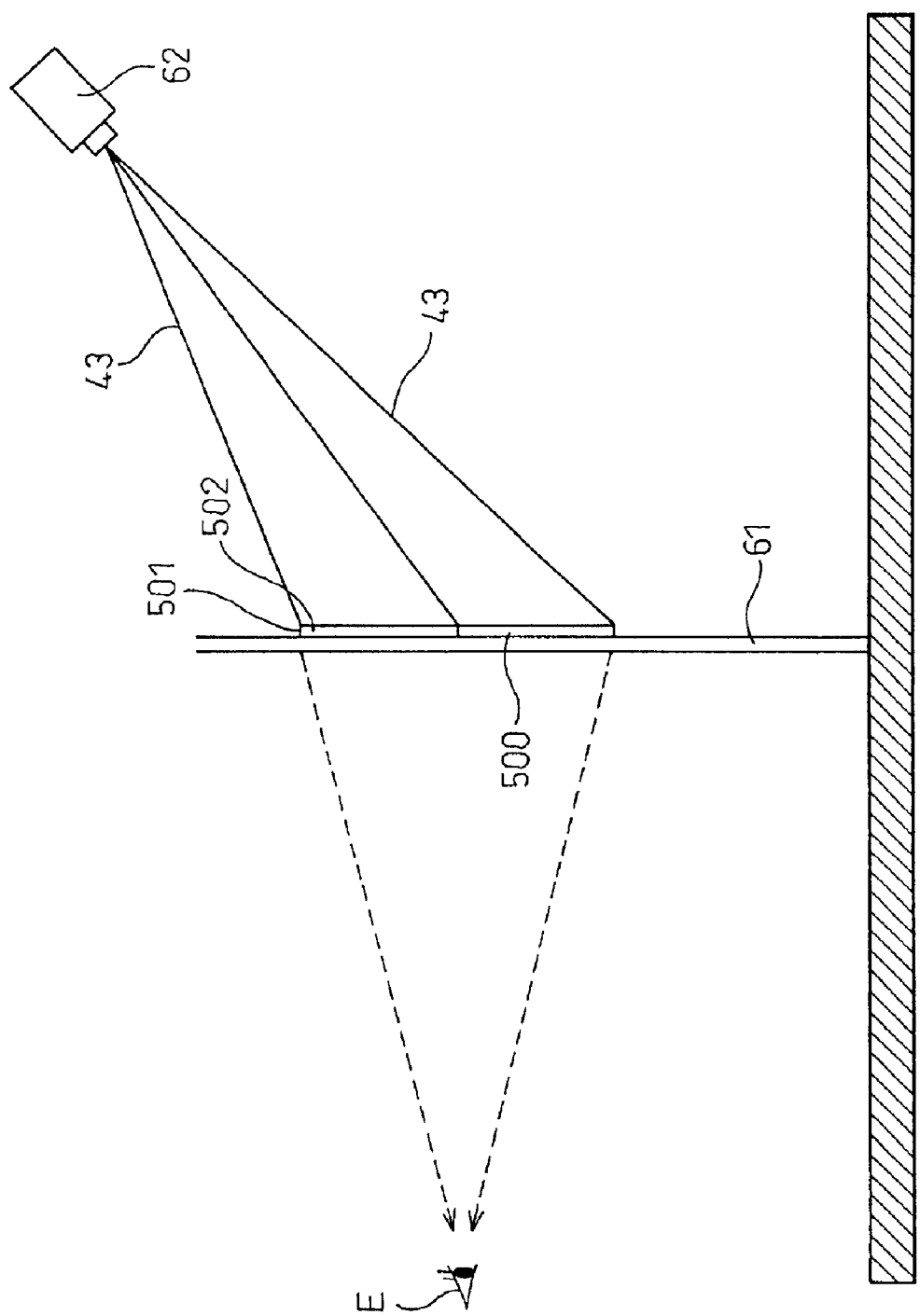

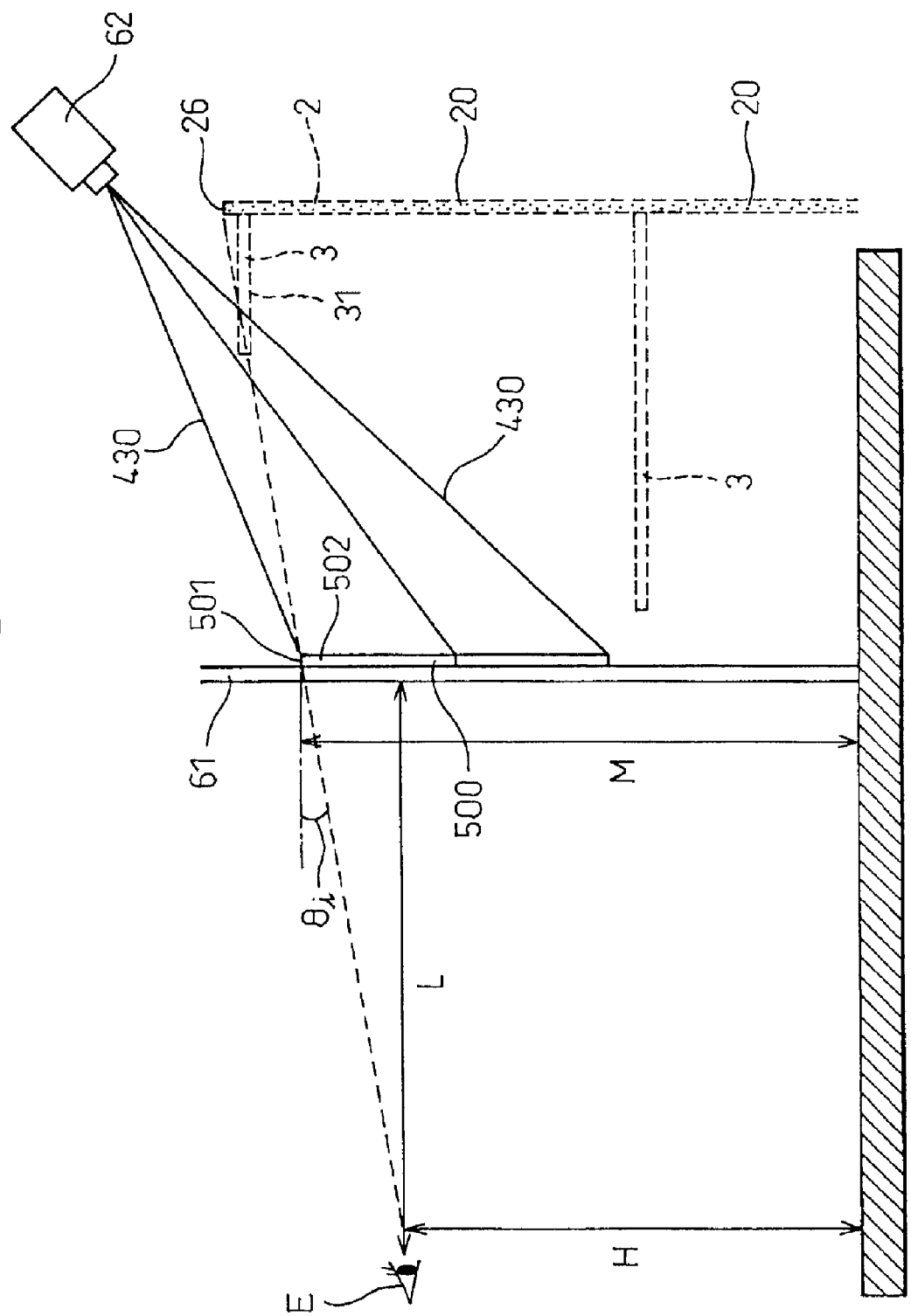

METHOD OF FABRICATING HOLOGRAM SCREEN AND HOLOGRAM IMAGING APPARATUS

BACKGROUND OF THE INVENTION

1. Field of the Invention

The present invention relates to a method of fabricating a hologram screen for displaying an image by projecting the image light on a hologram and a hologram imaging apparatus used for the method.

2. Description of the Related Art

In a conventional method, a hologram is fabricated by exposing a photosensitive member using an exposure optical system as shown in FIG. 14 (Japanese Unexamined Patent Publication No. 11-102153).

According to this conventional method, as shown in FIG. 14, a laser beam 86 generated by a laser oscillator 81 is separated into two beams by a beam splitter 82 to produce split light beams 87, 88.

The split beam 87 is diverged through reflectors 831, 832 and an objective lens 841, and this divergent beam is radiated as a reference beam 941 on a photosensitive member 95 obliquely from an upper position.

The other split beam 88 is diverged through a reflector 833 and an objective lens 842, and this divergent beam is radiated on a photosensitive member 95 as an object beam 942 through a light diffuser 92.

As a result, the reference beam 941 and the object beam 942 interfere with each other on the photosensitive member 95 thereby to produce a hologram. Using this hologram, a hologram screen is fabricated.

In an exposure optical system used for this method of fabricating a hologram screen, as shown in FIG. 14, mirrors 93 are arranged to extend toward the photosensitive member 95 at the end portions 921, respectively, of the light diffuser 92 (FIG. 2). In this way, as shown in FIG. 15, the object beam 942 is reflected on the mirror 93 and can enter the photosensitive member 95, thereby producing the same effect as if a large light diffuser is recorded on a hologram.

Specifically, as shown in FIG. 18, the light diffuser 920 reproduced by projecting the white light 430 on the whole hologram screen 950 at an angle and from a distance similar to the reference beam 941 is larger than the light diffuser 92 used for picking up an image.

The hologram screen 950, as shown in FIG. 16, for example, is used by being attached on a glass plate 61 in such a place as a show window or the reception windows of banks or hospitals. The image light 43 is projected by the projector 62 obliquely from an upper position on the hologram screen 950 thus attached on the glass plate 61 thereby to display an image. Specifically, the image light 43 is scattered and transmitted through the hologram screen 950 so that a viewer E1 located on the other side of the glass plate 61 with respect to the projector 62 recognizes an image through the glass plate 61.

The method of fabricating the hologram screen described above, however, poses the following problem. Specifically, as shown in FIG. 16, the viewer E1 standing on the front of the hologram screen 950 fabricated by the method described above can watch an image from the upper end 951 to the lower end 959. In the case where the viewer watches the hologram screen 950 obliquely from a lower position or at a position nearer to the hologram screen 950, however, the image at the upper end portion 952 of the hologram screen 950 is not visible, as shown in FIG. 17.

The reason why this phenomenon occurs will be explained below with reference to FIG. 18.

As described above, the mirrors 93 are arranged at the end portions 921 of the light diffuser 92 of the hologram screen 950 to expose the image, and therefore, as shown in FIG. 18, the light diffuser 92 reproduced when the white light 430 is projected is substantially coincident with a light diffuser (hereinafter referred to as "the pseudo light diffuser") 920 enlarged by the mirrors 93.

When using the hologram screen 950, therefore, the image can be watched in a visual range in which the pseudo diffuser 920 is visible at a position thereof relative to the hologram screen 950 coincident with the position of the light diffuser 92 relative to the photosensitive member 95 at the time of exposure.

Specifically, as shown in FIG. 18, the angle $\theta_h$, which the straight line connecting the upper end portion 951 of the hologram screen 950 and the upper end portion 926 of the pseudo diffuser 920 forms with the normal to the hologram screen 950, is substantially coincident with the visual angle at the upper end portion 952 of the hologram screen 950. This angle $\theta_h$ is substantially equal to the angle $\theta_H$ which the straight line connecting the photosensitive member 95 and the forward end 931 of the upper mirror 93 forms with the normal to the photosensitive member 95 at the time of exposure.

On the other hand, the angle $\theta_1$ which the straight line connecting the lower end 959 of the hologram screen 950 and the lower end 927 of the pseudo diffuser 920 forms with the normal to the hologram screen 950 provides a visual angle at the lower end portion 958 of the hologram screen 950. This angle $\theta_1$ is substantially equal to the angle $\theta_L$ which the straight line connecting the photosensitive member 95 and the forward end 931 of the lower mirror 93 forms with the normal to the photosensitive member 95 at the time of exposure.

Specifically, the visual range of the hologram screen 950 is considered to exist from $\theta_H$ at upper side to $\theta_L$ at lower side.

In the case where the viewer E1 watches the image displayed on the hologram screen 950 at an appropriate distance from the front of the hologram screen 950, therefore, the upper end portion 952 and the lower end portion 958 of the hologram screen 950 exist within the visual range. Thus, the viewer can watch the image on the whole hologram screen 950 (FIG. 18).

In the case where the viewer E2 watches the hologram screen 950 obliquely from a lower position, however, the angle which the straight line connecting the viewer E2 and the upper end portion 951 of the hologram screen 950 forms with the normal to the hologram screen 950 is larger than the visual angle $\theta_H$, and therefore the viewer E2 cannot watch the image at the upper end portion 952 which fails to function as a part of the screen. Specifically, the upper limit of the range in which the viewer E2 can recognize the image on the hologram screen 950 is the portion lower than the crossing point P between the straight light connecting the viewer E2 and the upper end portion 926 of the pseudo light diffuser 920 and the hologram screen 950. Thus, the portion higher than the crossing point P (upper end portion 952) cannot be recognized by the viewer E2 as an image, as shown in FIG. 17.

A similar phenomenon occurs also in the case where the viewer E3 approaches excessively close to the hologram screen 950, as shown in FIG. 18. In such a case, the angle which the straight line connecting the viewer E3 and the upper end 951 of the hologram screen 950 forms with the normal to the hologram screen 950 is larger than the visual angle $\theta_H$.

The above-mentioned phenomenon rarely occurs at the lower end portion 952 of the hologram screen 950. This is by reason of the fact that the mirror 93 arranged at the lower end of the light diffuser 92 at the time of exposure of the hologram is sufficiently long and, therefore, as shown in FIG. 18, the pseudo diffuser 920 is sufficiently long downward.

The mirror 93 arranged at the upper end of the light diffuser 92, however, which is arranged so as not to block the incidence path of the reference beam 941, is comparatively short. Therefore, the pseudo light diffuser 920 is not sufficiently long upward.

As a result, in spite of the fact that the visual angle ($\approx\theta_L\approx\theta_l$) at the lower end portion 952 of the hologram screen 950 is sufficiently large, the visual angle ($\approx\theta_H\approx\theta_h$) at the upper end portion 951 is comparatively small. Therefore, the problem is posed that the visual range at the upper end portion 951 of the hologram screen 950 is narrow.

Assume, on the other hand, that the hologram screen 950 is fabricated in such a manner that the reference beam 941 is radiated obliquely from a lower position and the image light 43 is also radiated obliquely from a lower position in operation. Then, unlike in the aforementioned case, the problem is posed that the visual range at the lower end portion 952 is narrow.

Specifically, the visual range is narrow at the end portion of the hologram screen 950 nearer to the light source of the reference beam 941, i.e. the objective lens 841. The problem, therefore, is how to enlarge the visual range at the end portion of the hologram screen 950 nearer to the light source of the reference beam 941.

SUMMARY OF THE INVENTION

Accordingly, the object of the present invention, which has been developed in view of the above-mentioned facts, is to provide a method of fabricating a hologram screen having a large visual range and a hologram imaging apparatus used for the particular method.

According to a first aspect of the invention, there is provided a method of fabricating a hologram screen, comprising the steps of arranging a plurality of mirrors extended toward a plurality of photosensitive members at the end portions or in the neighborhood of the end portions, respectively, of a light diffuser, forming a plurality of holograms by exposing a plurality of the photosensitive members individually using a reference beam and an object beam passed through the light diffuser, and arranging and integrating a plurality of the holograms two-dimensionally, wherein the mirror arranged on the side nearer to the light source of the reference beam is replaced with another mirror having a different length of extension from the light diffuser in accordance with the position of the individual photosensitive member to be exposed.

What is most noticeable about this aspect of the invention is that the length of extension of the reference beam-side mirror from the light diffuser is changed in accordance with the position of the photosensitive member to be exposed.

The light source of the reference beam is defined as the objective lens 841 of the conventional hologram imaging apparatus described above (FIG. 14).

Now, the operation and effects of this aspect of the invention will be explained.

As described above, the larger the length of extension of the reference beam-side mirror, the larger the visual range at the end portion of the hologram screen nearer to the reference beam. An excessively large length of extension of the reference beam-side mirror, however, blocks the incidence path of the reference beam. Therefore, the length of extension of the reference beam-side mirror has its own limit.

Thus, the visual range of the hologram screen fabricated can be enlarged by extending the reference beam-side mirror as far as possible to the extent that the incidence path of the reference beam is not blocked.

Also, the incidence path of the reference beam is varied with the position of the photosensitive member to be exposed. By changing the length of extension of the reference beam-side mirror from the light diffuser in accordance with the position of the photosensitive member to be exposed, therefore, a hologram screen having a large visual range can be fabricated.

Further, the reference beam-side mirror is replaced with another mirror having a different length of extension to expose each photosensitive member. Specifically, a plurality of reference beam-side mirrors having different lengths of extension are prepared, and one of them is used to replace the reference beam-side mirror in accordance with the position of the photosensitive member to be exposed.

In this way, the length of extension of the reference beam-side mirror from the light diffuser can be easily changed, and therefore a hologram screen having a large visual range can be easily fabricated.

As described above, according to this aspect of the invention, there is provided a method of fabricating a hologram screen having a large visual range.

According to a second aspect of the invention, there is provided a method of fabricating a hologram screen, wherein the length of extension of the reference beam-side mirror is preferably set to a larger value when exposing the photosensitive member arranged nearer to the light source of the reference beam than when exposing the photosensitive member arranged farther from the light source of the reference beam (FIGS. 1A, 1B).

As described above, the visual range of the hologram screen can be enlarged by extending the reference beam-side mirror as far as possible and to the extent that the incidence path of the reference beam is not blocked.

The problem, however, is how to enlarge the visual range at the end portion of the hologram screen nearer to the light source of the reference beam.

In the case where the end portion of the hologram screen farther from the light source of the reference beam is exposed, on the other hand, the length of extension of the reference beam-side mirror is required to be reduced in order not to block the path of the reference beam incident to the particular end portion.

For this reason, as described above, when exposing the photosensitive member arranged nearer to the light source of the reference beam, the length of extension of the reference beam-side mirror is increased, whereas when exposing the photosensitive member arranged farther from the light source of the reference beam, the length of extension of the reference beam-side mirror is reduced. As a result, the visual range at the end portion of the hologram screen nearer to the reference beam can be enlarged.

As a result, a hologram screen having a large visual range can be positively fabricated.

According to a third aspect of the invention, there is provided a method of fabricating a hologram screen, comprising the steps of arranging a plurality of mirrors extended toward a plurality of photosensitive members at the end portions or in the neighborhood of the end portions, respectively, of a light diffuser, forming a plurality of holograms by exposing a plurality of the photosensitive members individually by a reference beam and an object beam passed through the light diffuser, and arranging and integrating a plurality of the holograms two-dimensionally, wherein the distance between a photosensitive member arranged nearer to the light source of the reference beam and the light diffuser having the extended mirror thereon for exposing the particular photosensitive member is smaller than the distance between another photosensitive member arranged farther from the light source of the reference beam and the light diffuser having the extended mirror thereon for exposing the particular another photosensitive member (FIGS. 1C, 1D).

The smaller the distance between the light diffuser and the photosensitive member, the larger the length of extension of the reference beam-side mirror. In similar fashion, the visual range at the end portion of the hologram screen nearer to the reference beam is enlarged. An excessively small distance between the light diffuser and the photosensitive member, however, would cause the light diffuser or the mirror extended from the light diffuser to block the incidence path of the reference beam. Therefore, the shortening of the distance between the light diffuser and the photosensitive member has its own limit.

In this way, the visual range of the hologram screen fabricated can be enlarged by minimizing the distance between the photosensitive member and the light diffuser having the extended mirror thereon to the extent that the incidence path of the reference beam is not blocked.

As described above, a hologram screen having a large visual range can be fabricated by changing the distance between the photosensitive member and the light diffuser having the extended mirror thereon, in accordance with the position of the photosensitive member to be exposed.

According to a fourth aspect of the invention, there is provided a method of fabricating a hologram screen, comprising the steps of arranging a plurality of mirrors extended toward a plurality of photosensitive members at the end portions or in the neighborhood of the end portions, respectively, of a light diffuser, forming a plurality of holograms by exposing a plurality of the photosensitive members individually using a reference beam and an object beam passed through the light diffuser, and arranging and integrating a plurality of the holograms two-dimensionally, wherein when exposing a photosensitive member arranged nearer to the light source of the reference beam, the position of the photosensitive member relative to the light diffuser having the extended mirror thereon is moved in such a manner as to increase the angle that the straight light connecting the forward end portion of the reference beam-side mirror arranged nearer to the light source of the reference beam and the end portion of the photosensitive member nearer to the light source of the reference beam forms with the normal to the end portion of the photosensitive member nearer to the light source of the reference beam (FIG. 6).

According to this fabrication method, the angle $\theta_H$ that the straight line connecting the end portion of the photosensitive member nearer to the reference beam-side mirror and the forward end of the reference beam-side mirror forms with the normal to the same photosensitive member can be increased. Thus, the visual range at the end portion of the hologram screen nearer to the reference beam can be increased.

As a result, a hologram screen having a large visual range can be fabricated.

In this fabrication method, when exposing the photosensitive member arranged nearer to the light source of the reference beam, the incidence path of the reference beam is moved in parallel in accordance with the displacement of the relative position described above.

According to a fifth aspect of the invention, there is provided a method of fabricating a hologram screen, comprising the steps of arranging a plurality of mirrors extended toward a plurality of photosensitive members at the end portions or in the neighborhood of the end portions, respectively, of a light diffuser, forming a plurality of holograms by exposing a plurality of the photosensitive members individually using a reference beam and an object beam passed through the light diffuser, and arranging and integrating a plurality of the holograms two-dimensionally, wherein the distance over which the reference beam is projected on a photosensitive member is set to a value shorter than the distance over which the image light is projected on the hologram screen in operation (FIG. 8).

According to this aspect of this invention, the incident angle $\theta_r$ of the reference beam to the end portion of the photosensitive member nearer to the reference beam is smaller than the incident angle $\theta_c$ of the image light. Thus, as understood from the "hologram imaging formula" described below, the visual angle $\theta_i$ at the end portion of the hologram screen nearer to the reference beam is larger than in the case where the incident angle $\theta_r$ is equal to the incident angle $\theta_c$.

As a result, a hologram screen having a large visual range can be fabricated.

Specifically, the visual angle $\theta_i$ at the end portion of the hologram screen nearer to the reference beam can be calculated generally by the following "hologram imaging formula".

$$\theta_i = \sin^{-1}\{(\lambda_O/\lambda_c)(\sin\theta_H - \sin\theta_r) + \sin\theta_c\}$$

where $\lambda_O$ is the imaging wavelength (wavelength of the reference beam), $\lambda_c$ the wavelength of the image light, and $\theta_H$ the angle that the straight line connecting the end portion of the photosensitive member nearer to the reference beam and the forward end of the reference beam-side mirror forms with the normal to the photosensitive member (FIG. 9).

According to a sixth aspect of the invention, there is provided a method of fabricating a hologram screen, wherein the distance over which the reference beam is projected on a photosensitive member is set to a value shorter than the distance over which the image light is projected on the hologram screen in operation, and wherein the length of extension of the reference beam-side mirror is preferably increased to the extent that the incidence of the reference beam to the photosensitive member is not blocked by the reference beam-side mirror arranged nearer to the light source of the reference beam.

As a result, a hologram screen having a still larger visual range can be fabricated.

According to a seventh aspect of the invention, there is provided a method of fabricating a hologram screen, comprising the steps of arranging a plurality of mirrors extended toward a plurality of the photosensitive members at the end portions or in the neighborhood of the end portions, respectively, of a light diffuser, forming a plurality of holograms by exposing a plurality of the photosensitive members individually using a reference beam and an object beam passed through the light diffuser, and arranging and integrating a plurality of the holograms two-dimensionally, wherein the angle at which the reference beam is projected on a photosensitive member is set to a value smaller than the angle at which the image light is projected on the hologram screen in operation (FIG. 11).

Also in this case, the incident angle $\theta_r$ of the reference beam to the end portion of the photosensitive member nearer to the reference beam is smaller than the incident angle $\theta_c$ of the image light. Therefore, as understood from the hologram imaging formula described above, the visual angle $\theta_i$ at the end portion of the hologram screen nearer to the reference beam is larger than in the case where the incident angle $\theta_r$ is equal to the incident angle $\theta_c$.

As a result, a hologram screen having a large visual range can be fabricated positively.

According to an eighth aspect of the invention, there is provided a method of fabricating a hologram screen, comprising the steps of arranging a plurality of mirrors extended toward a plurality of the photosensitive members at the end portions or in the neighborhood of the end portions, respectively, of a light diffuser, forming a plurality of holograms by exposing a plurality of the photosensitive members individually using a reference beam and an object beam passed through the light diffuser, and arranging and integrating a plurality of the holograms two-dimensionally, wherein the angle at which the reference beam is projected on a photosensitive member is set to a value larger than the angle at which the image light is projected on the hologram screen in operation, and wherein the length of extension of the reference beam-side mirror is increased further to the extent that the incidence of the reference beam to the photosensitive member is not blocked by the reference beam-side mirror located nearer to the light source of the reference beam.

In this case, the length of extension of the reference beam-side mirror can be increased even further. As a result, a hologram screen having a large visual range can be fabricated.

According to a ninth aspect of the invention, there is provided a hologram imaging apparatus for exposing a plurality of photosensitive members by radiating a reference beam and an object beam passed through a light diffuser individually on a plurality of the photosensitive members thereby to form a plurality of holograms and arranging and integrating the holograms with each other two-dimensionally thereby to fabricate a hologram screen, the apparatus comprising:

means for holding a plurality of the photosensitive members at positions corresponding to the positions of the holograms to be integrated subsequently; and a plurality of mirrors arranged to extend toward the photosensitive members at or in the neighborhood of the end portions, respectively, of the light diffuser;

wherein the reference beam-side mirror arranged nearer to the light source of the reference beam is so configured that the length of extension thereof from the light diffuser can be changed.

Thus, the length of extension of the reference beam-side mirror from the light diffuser can be changed in accordance with the position of the photosensitive member to be exposed. As a result, a hologram screen having a large visual range can be easily fabricated by use of the hologram imaging apparatus described above.

According to a tenth aspect of the invention, there is provided a hologram imaging apparatus, wherein the reference beam-side mirror can be preferably replaced with another mirror having a different length of extension.

As a result, the length of extension of the reference beam-side mirror from the light diffuser can be easily changed. Thus, a hologram screen having a large visual range can be easily fabricated.

According to an 11th aspect of the invention, there is provided a hologram imaging apparatus for exposing a plurality of photosensitive members by radiating a reference beam and an object beam passed through a light diffuser individually on a plurality of the photosensitive members thereby to form a plurality of holograms and arranging and integrating the holograms with each other two-dimensionally thereby to fabricate a hologram screen, the apparatus comprising:

means for holding a plurality of photosensitive members at positions corresponding to the positions of the holograms to be integrated subsequently; and a plurality of mirrors arranged to extend toward the photosensitive members at or in the neighborhood of the end portions, respectively, of the light diffuser;

wherein the holding means are configured so that the photosensitive members can be moved in the direction parallel to the photosensitive members.

By using the hologram imaging apparatus described above, the arrangement of the photosensitive members can be easily changed. As a result, in exposing the photosensitive members, the relative positions of the photosensitive members can be changed to the relative positions at which the photosensitive members are integrally rearranged after exposure.

As a result, a hologram screen having a large visual range can be easily fabricated.

BRIEF DESCRIPTION OF THE DRAWINGS

FIGS. 1A, 1B, 1C and 1D are diagrams for explaining a method of fabricating a hologram screen according to a first embodiment of the invention, in which FIG. 1A shows a lower photosensitive member exposed, FIG. 1B shows an upper photosensitive member exposed, FIG. 1C shows a light diffuser relocated in proximity to the photosensitive members, and FIG. 1D shows a light diffuser having no reference beam-side mirror relocated in proximity to the photosensitive members.

FIG. 4 is a diagram for explaining the operation of a hologram screen according to the first embodiment of the invention.

FIG. 5 is a diagram for explaining a method of measuring the visual range at the upper end portion of a hologram screen according to a second embodiment of the invention.

FIGS. 6A and 6B are diagrams for explaining a method of fabricating a hologram screen according to a third embodiment of the invention, in which FIG. 6A shows the lower photosensitive member exposed, and FIG. 6B shows the upper photosensitive member exposed.

DESCRIPTION OF THE PREFERRED EMBODIMENTS

First Embodiment

A method of fabricating a hologram screen and a hologram imaging apparatus comprising the hologram screen according to embodiments of the invention will be explained below with reference to FIGS. 1A–1D to FIG. 4.

Figure 3:
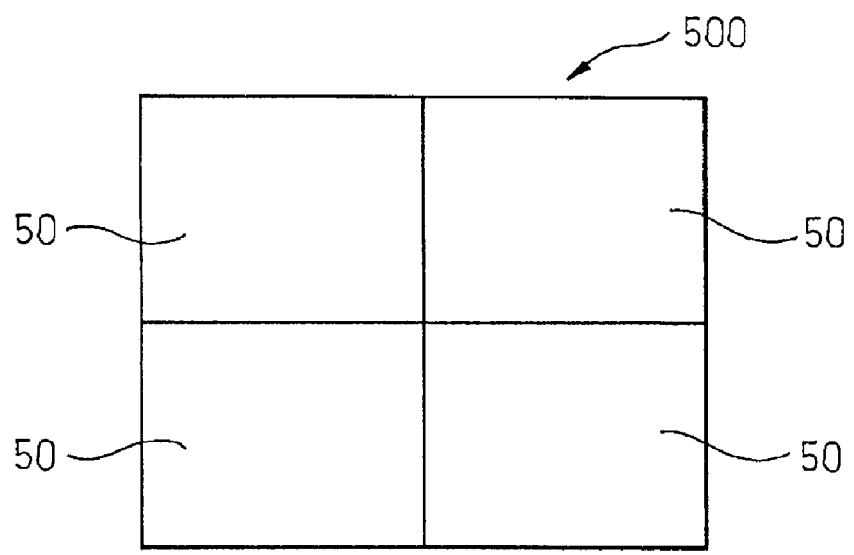
FIG. 3 is a front view of a hologram screen according to the first embodiment of the invention.

In the method of fabricating a hologram screen according to the first embodiment, as shown in FIGS. 1A–1D, a reference beam 41 and object beams 42 that have passed through a light diffuser 2 are radiated individually on a plurality of photosensitive members 5 thereby to form holograms 50 and, as shown in FIG. 3, a plurality of the holograms 50 are arranged and integrated two-dimensionally thereby to fabricate a hologram screen 500.

This embodiment represents a case in which the reference beam 41 is radiated on the photosensitive members 5 obliquely from an upper position to fabricate the hologram screen 500, and image beams 43 are radiated on the hologram screen 500 obliquely from an upper position thereby to display an image.

First, a hologram imaging apparatus 1 used for exposing the photosensitive members 5 in the process of fabricating the hologram screen 500 will be explained with reference to FIGS. 1A–1D and 2.

The hologram imaging apparatus 1, as shown in FIGS. 1A–1D, comprises means 11 for holding a plurality of the photosensitive members 5 at a position corresponding to a position for subsequent arrangement for integration, and a plurality of mirrors 3 arranged to extend toward the photosensitive members 5 from the end portions 21 of the light diffuser 2. The holding means 11 is a transparent glass plate.

Figure 2:
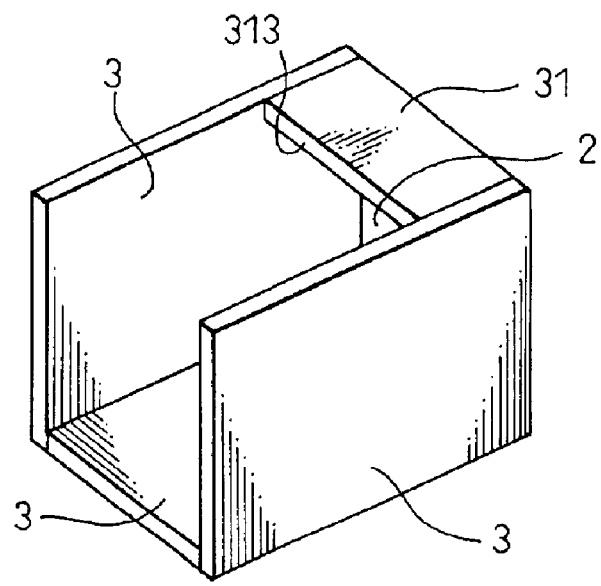
FIG. 2 is a perspective view showing a part of a hologram imaging apparatus according to the first embodiment of the invention.

The mirrors 3, as shown in FIG. 2, are arranged at the end portions of the four sides of the square light diffuser. Among the mirrors 3, the reference beam-side mirror 31 arranged nearer to the light source of the reference beam 41 is extended by a smaller length than the other mirrors 3.

Figure 1A:
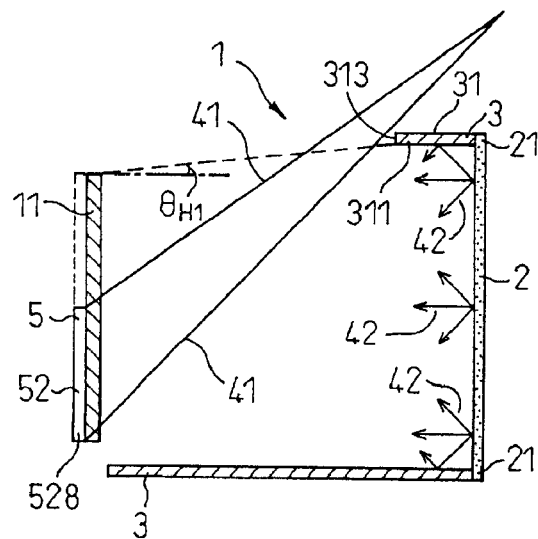
Figure 1C:
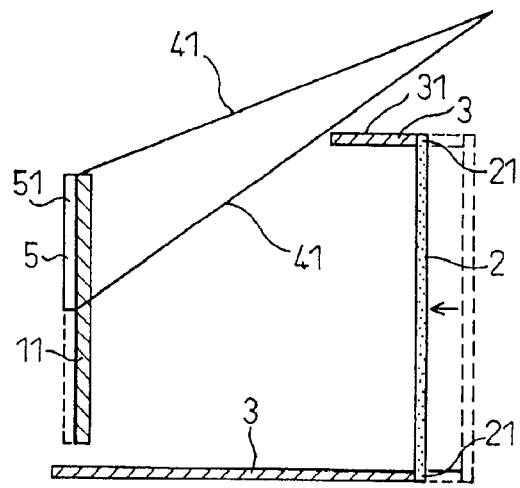
Figure 1B:
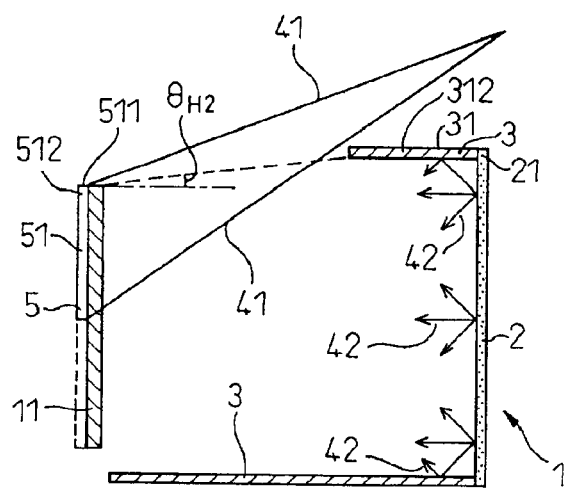

The reference beam-side mirror 3, as shown in FIGS. 1A and 1B, is so configured that the length of extension thereof from the light diffuser 2 can be changed. Specifically, the reference beam-side mirror 31 can be removed from the light diffuser 2 and the other mirrors 3 and replaced with another mirror having a different length of extension.

In the method of fabricating a hologram screen according to this embodiment, first, as shown in FIGS. 1A–1D, the reference beam 41 and the object beams 42 are radiated individually on the four photosensitive members 5 using the hologram imaging apparatus 1 thereby to form holograms 50. Then, four holograms 50 are arranged in juxtaposition, two by two, as shown in FIG. 3, and two-dimensionally integrated to fabricate a hologram screen 500.

The length by which the reference beam-side mirror 31 arranged nearer to the light source of the reference beam 41 is extended from the light diffuser 2 is changed in accordance with the position of each photosensitive member 5 to be exposed.

Specifically, as shown in FIG. 1B, in exposing the upper photosensitive member 51 nearer to the reference beam-side mirror 31, the length by which the reference beam-side mirror 31 is extended is increased. In the case where the lower photosensitive member 52 farther from the reference beam-side mirror 31 is exposed as shown in FIG. 1A, in contrast, the length by which the reference beam-side mirror 31 is extended is decreased.

As a means of extending the reference beam-side mirror 31, the reference beam-side mirror 31 is replaced with another similar mirror having a different length of extension to expose the photosensitive members 51, 52. Specifically, in the case where the lower photosensitive member 52 is exposed as shown in FIG. 1A, the reference beam-side mirror 311 having a shorter extension is used, whereas in the case where the upper photosensitive member 51 is exposed as shown in FIG. 1B, the reference beam-side mirror 312 having a longer extension is used.

Instead of changing the length by which the reference beam-side mirror 311 is extended, the distance between the light diffuser 2 and the photosensitive members may be changed. Specifically, in changing the position of exposure from the lower photosensitive member 52 shown in FIG. 1A to the upper photosensitive member 51, the light diffuser 2 is relocated, from the position of FIG. 1A to that of FIG. 1C, toward the photosensitive member 5. Alternatively, the photosensitive member 5 may be relocated toward the light diffuser 2.

Figure 1D:
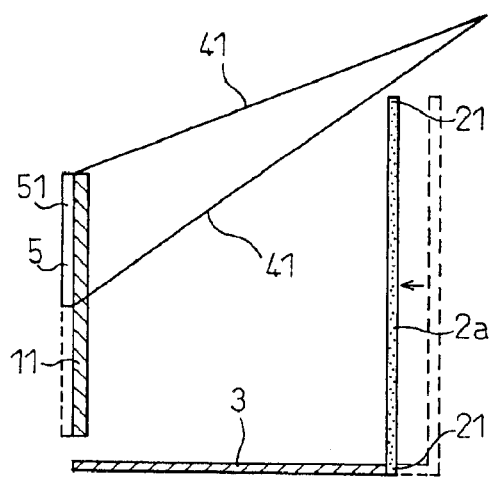

As another alternative, the distance between the light diffuser 2a and the photosensitive member 5 may be changed using a light diffuser 2a having no reference beam-side mirror 311 arranged thereon, as shown in FIG. 1D.

In any of these cases, the same effect can be achieved as in the case of changing the length by which the reference beam-side mirror 31 is extended.

Figure 14:
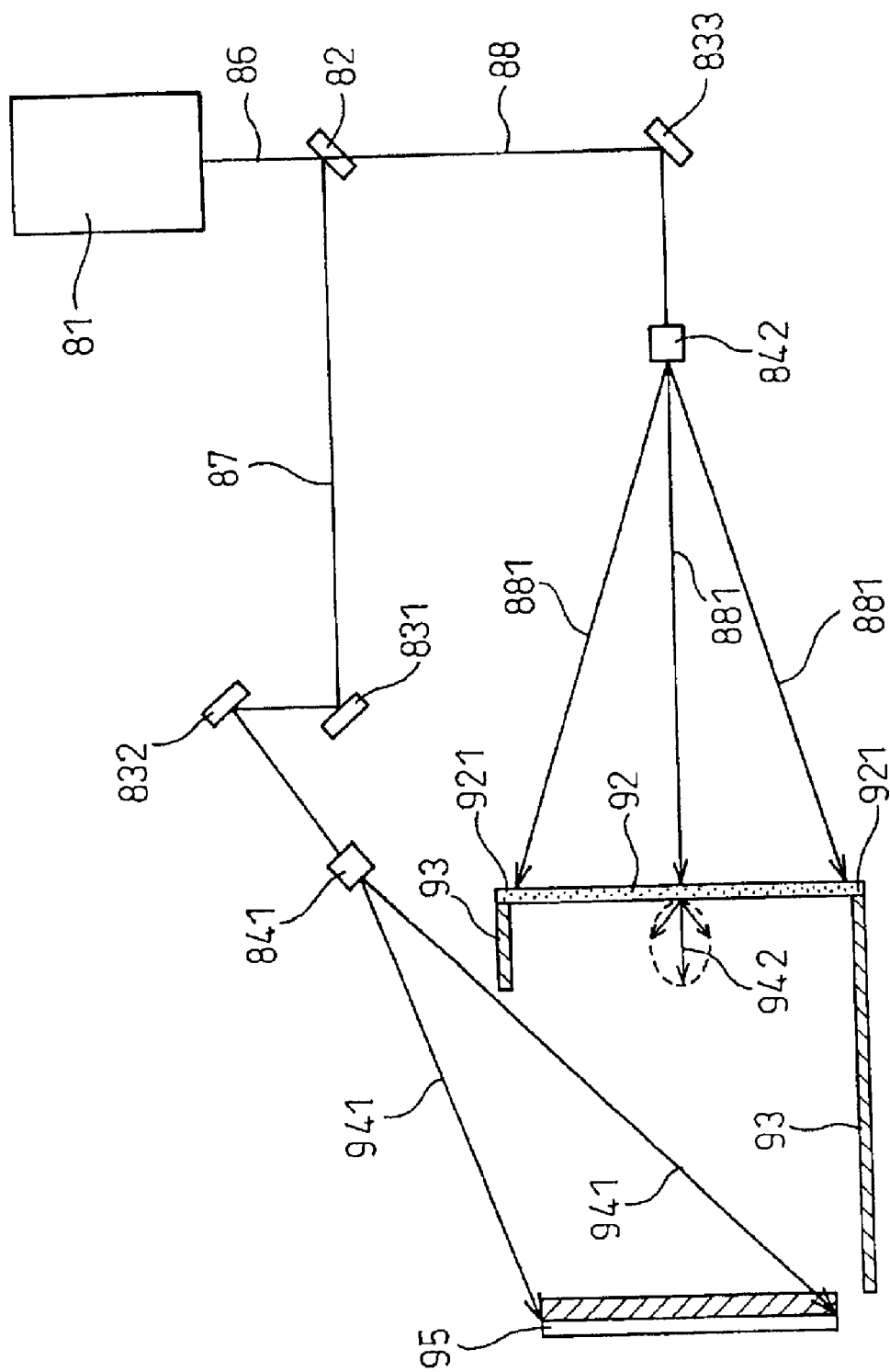
FIG. 14 is a diagram for explaining a conventional hologram imaging apparatus.
Figure 15:
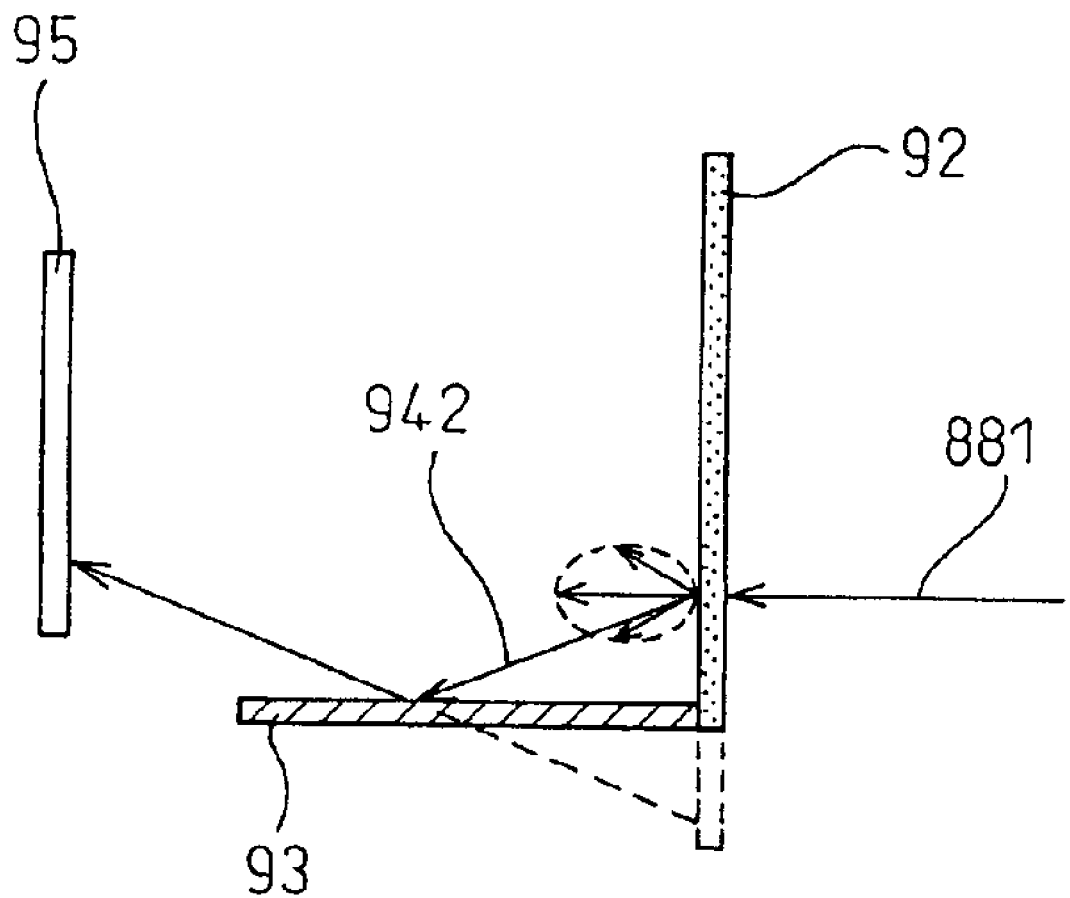
FIG. 15 is a diagram for explaining the functions of a mirror according to the prior art.
Figure 16:
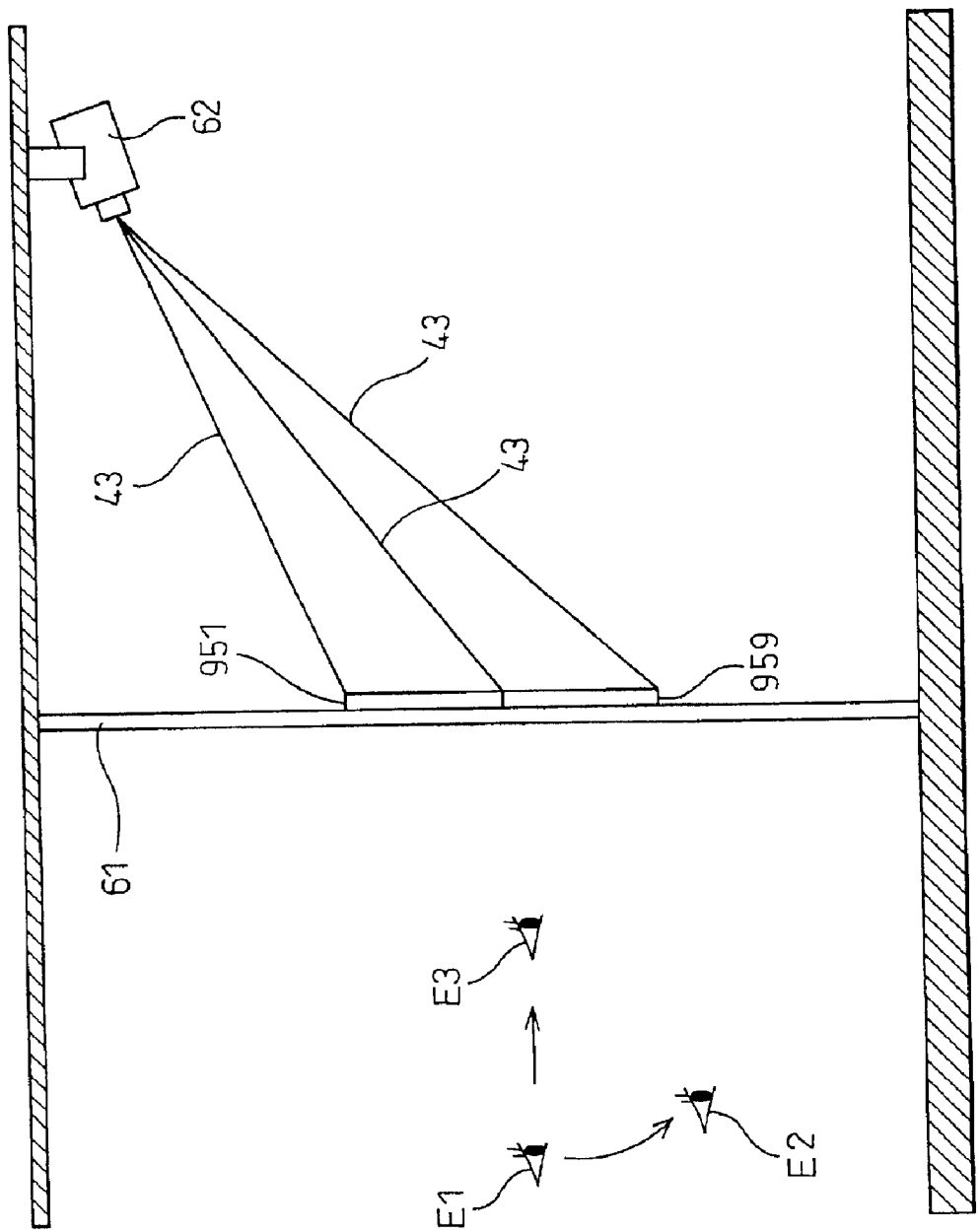
FIG. 16 is a diagram for explaining the operation of a conventional hologram screen.
Figure 17:
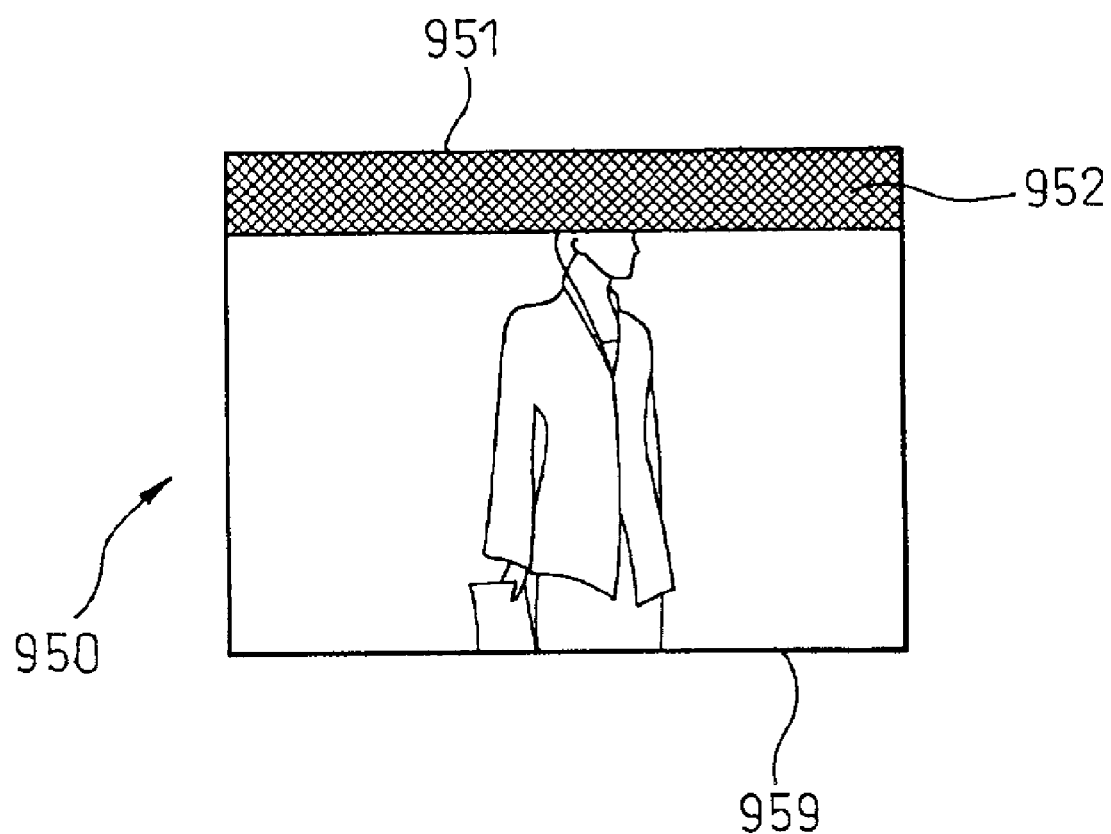
FIG. 17 is a diagram for explaining the malfunctions of a conventional hologram screen.

The reference beam 41 and the object beams 42 are generated by a conventional exposure optical system (FIG. 14).

The hologram screen 500 produced by the fabrication method described above is used by being stuck on a transparent glass plate 61 as shown in FIG. 4. A projector 62 is arranged at a position diagonally upward of the hologram screen 500 stuck on the glass plate 61. The projector 62 is arranged in such a manner that the incident angle of the image light 43 to the hologram screen 500 is substantially equal to the incident angle of the reference beam 41 to the photosensitive member 5.

The image light 43 projected from the projector 62 on the hologram screen 500 is scattered and transmitted through the hologram screen 500. As a result, the image can be recognized by a viewer E located on the other side of the hologram screen 500 with respect to the projector 62 through the glass plate 61.

Now, the operation and effects of this embodiment will be explained.

As described above, the larger the length of extension of the reference beam-side mirror 31, the larger the visual range at the end portions 21 of the hologram screen 500 nearer to the reference beam. An excessively large length of extension of the reference beam-side mirror 31, however, would block the incident path of the reference beam 41 and therefore the length of extension of the reference beam-side mirror 31 has its own limit.

Thus, the visual range of the hologram screen 500 can be increased by extending the reference beam-side mirror 31 to the maximum extent that the incident path of the reference beam 41 is not blocked.

The incident path of the reference beam 41 is varied with the position of the photosensitive member 5 to be exposed, as shown in FIGS. 1A, 1B.

By changing the length of extension of the reference beam-side mirror 31 from the light diffuser 2 in accordance with the position of the photosensitive member to be exposed, therefore, a hologram screen 500 having a large visual range can be fabricated.

Specifically, the length by which the reference beam-side mirror 31 is extended is increased in the case where the upper photosensitive member 51 nearer to the reference beam-side mirror 31 is exposed as shown in FIG. 1B, while the length by which the reference beam-side mirror 31 is extended is decreased in the case where the lower photosensitive member 52 farther from the reference beam-side mirror 31 is exposed as shown in FIG. 1A.

As a result, the visual range at the upper end portion 502 of the hologram screen 500 nearer to the light source of the reference beam 41 can be enlarged.

Specifically, the use of the reference beam-side mirror 311 having a small extension for exposing the upper photosensitive member 51 as shown in FIG. 1A results in a smaller angle $\theta_{H1}$ that the straight line connecting the upper end 511 of the photosensitive member 51 and the forward end 313 of the reference beam-side mirror 311 forms with the normal to the photosensitive member 5.

In the case where the reference beam-side mirror 312 having a longer extension is used as shown in FIG. 1B, in contrast, the angle $\theta_{H2}$ that the straight line connecting the upper end 511 of the photosensitive member 51 and the forward end 313 of the reference beam-side mirror 311 forms with the normal to the photosensitive member 5 is larger than the angle $\theta_{H1}$.

The angles $\theta_{H1}$, $\theta_{H2}$ are substantially equal to the visual angle $\theta_i$ at the upper end portion 502 of the hologram screen 500 fabricated as described above.

Therefore, as described above, the visual angle $\theta_i$ at the upper end portion 502 of the hologram screen 500 can be increased by changing the length of extension of the reference beam-side mirror 31.

In the case where the lower end portion 528 of the photosensitive member 52 is exposed as shown in FIG. 1A, in contrast, the smaller length of extension of the reference beam-side mirror 311 prevents the reference beam 41 from being blocked.

For this reason, a hologram screen 500 having a large visual range can be positively fabricated.

Also, in view of the fact that the reference beam-side mirror 31 is replaced with another similar mirror having a different length of extension to expose the photosensitive members 51, 52, the length by which the reference beam-side mirror 31 extends from the light diffuser 2 can be easily changed for exposure. As a result, a hologram screen 500 having a large visual range can be easily fabricated.

As described above, according to this embodiment, there are provided a method of fabricating a hologram screen and a hologram imaging apparatus having a large visual range.

Second Embodiment

This embodiment represents a case, as shown in FIG. 5, in which the visual range of a hologram screen fabricated by the fabrication method according to the first embodiment is measured.

Specifically, each of the four portions, into which a hologram screen having a diagonal of 40 inches (aspect ratio of 3 to 4) is divided, is exposed by the method of the first embodiment.

The size of the light diffuser 2 is 720 mm by 850 mm, and the mirror 31 arranged at the lower end portion of the light diffuser 2 is extended by 800 mm. Also, the reference beam 41 is projected over the distance of 1600 mm at a projection angle of 35° to the upper end portion of the lower photosensitive member 52 at the lower end of the upper photosensitive member 51.

The reference beam-side mirror 311 (FIG. 1A) used for exposing the lower photosensitive member 52 is extended by 320 mm, and the reference beam-side mirror 312 (FIG. 1B) used for exposing the upper photosensitive member 51 by 450 mm.

In comparison, a hologram screen is produced by the conventional fabrication method. Specifically, a hologram screen is fabricated by exposure without division with the reference beam-side mirror extended by 320 mm. The other sizes are similar to the corresponding sizes of the present invention.

For the hologram screen 500 according to this invention obtained by the fabrication method described above, the angle $\theta_{H2}$ (FIG. 1A) is measured. This angle $\theta_{H2}$ provides the visual angle $\theta_i$ at the upper end portion 502 of the hologram screen 500.

Figure 18:
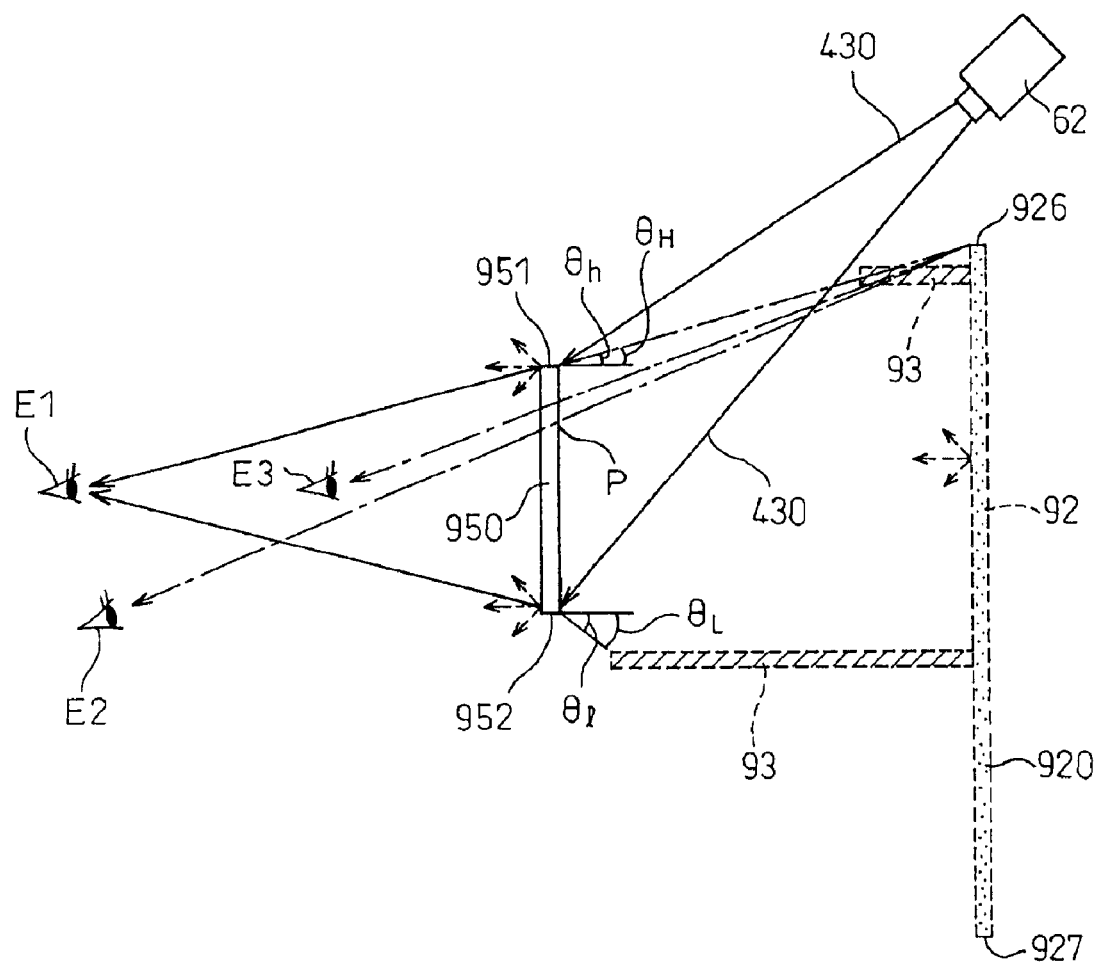
FIG. 18 is a diagram for explaining the visual range of a conventional hologram screen.

For the hologram screen produced by the conventional fabrication method, on the other hand, the angle $\theta_H$ (FIG. 18) is measured. This angle $\theta_H$ is coincident with the angle $\theta_{H2}$ and also substantially equal to the visual angle $\theta_i$ at the upper end portion of the conventional hologram screen.

The measurement shows that the angle $\theta_H$ ($\approx$visual angle $\theta_i$,) of the conventional hologram screen is 6.8°, whereas the angle $\theta_{H2}$ ($\approx$visual angle $\theta_i$) of the hologram screen according to this invention is a larger 9.2°.

Also, as shown in FIG. 5, white light 430 is actually projected on the hologram screen 500, and a pseudo diffuser (white screen) 20 enlarged from the light diffuser 2 by the mirror 3 is displayed. Then, the visual range in which the pseudo diffuser 20 is visible is measured. The white light 430 is projected on the hologram screen 500 from the same relative position as the position of the reference beam 41 relative to the photosensitive member 5.

As shown in FIG. 5, by letting the viewer E, standing at a distance L from the hologram screen 500, change the height of his line of sight up and down, the height H is determined at which the upper end 501 of the hologram screen 500 coincides with the upper end 26 of the reconstructed pseudo diffuser 20.

Based on the height H thus determined, the distance L and the height M of the upper end 501 of the hologram screen 500, the visual angle $\theta_i$ at the upper end portion 502 of the hologram screen is determined from the following equation.

$$\theta_i = \tan^{-1}((M-H)/L)$$

As a result, $\theta_i=5.5°$ for the conventional hologram screen, while $\theta_i$ is increased to 8.1° for the hologram screen according to the invention.

These values of $\theta_i$ are smaller than $\theta_{H2}$, $\theta_H$ calculated from the length of extension of the reference beam-side mirror 31 by reason of the fact that the pseudo diffuser is displayed using white light on the hologram screen imaged with an imaging wavelength of 514 nm (See the hologram imaging formula).

It is thus seen that the hologram screen according to the invention has a large visual range.

Third Embodiment

Figure 6A:
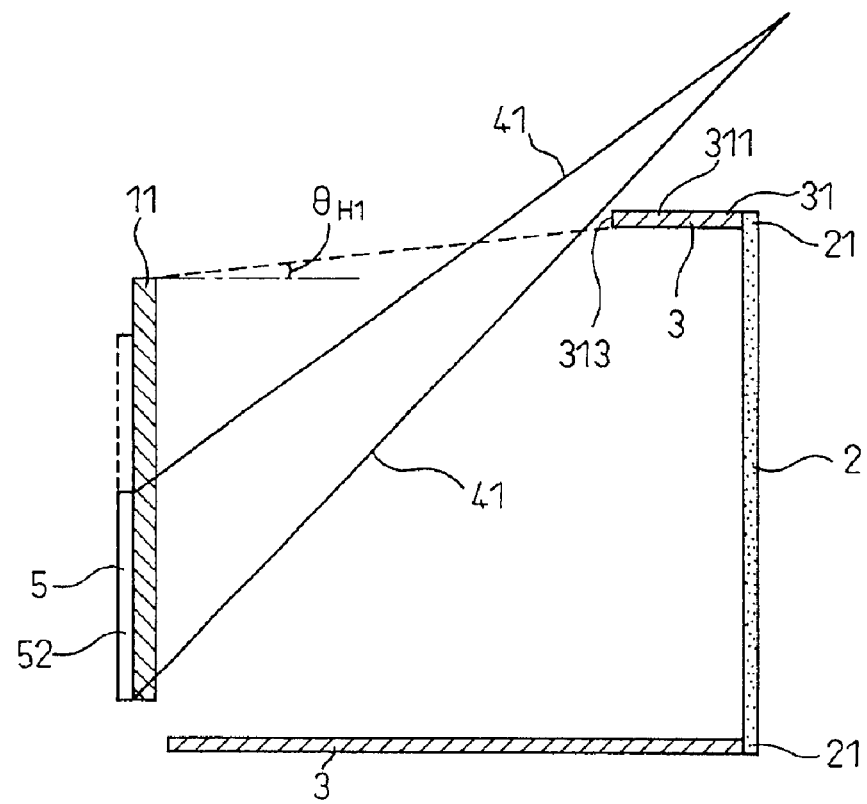
Figure 6B:
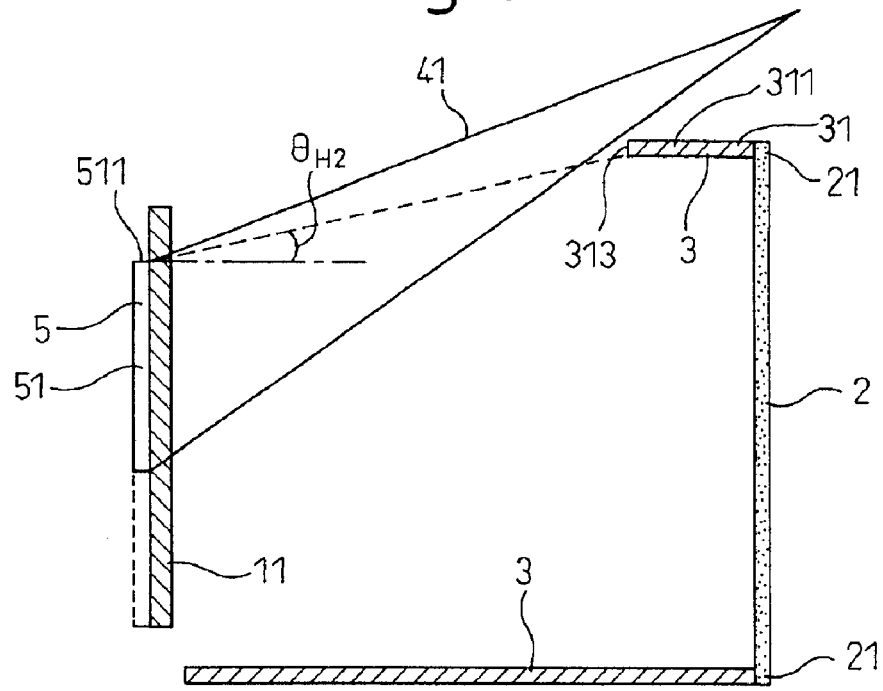
Figure 7:
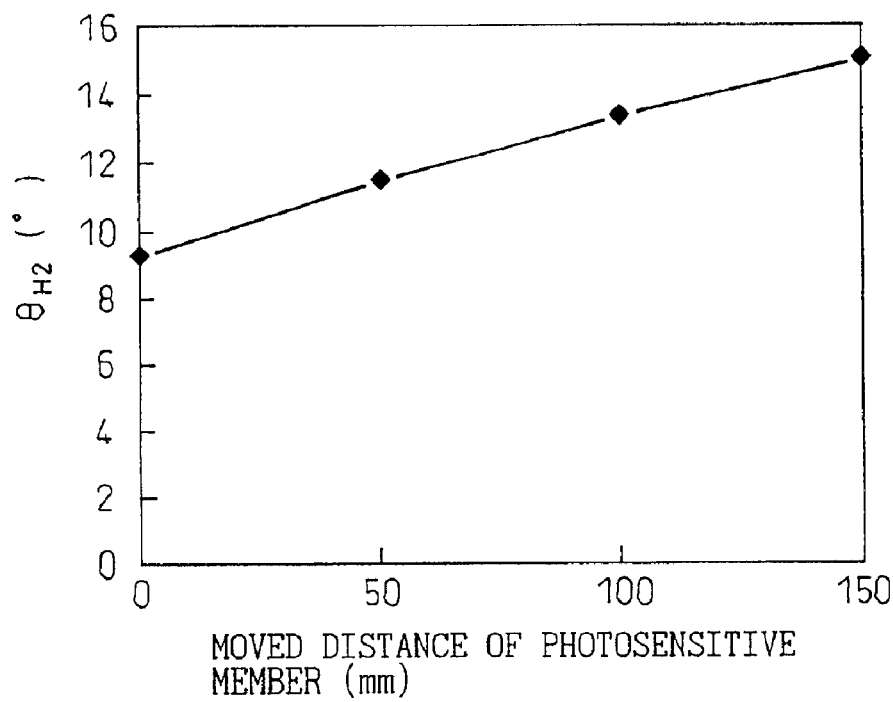
FIG. 7 is a diagram showing the relation between the moved distance of a photosensitive member and the angle $\theta_{H2}$ according to a fourth embodiment of the invention.

This embodiment provides a method of fabricating a hologram screen, in which, as shown in FIGS. 6A, 6B and 7, the photosensitive members 5 are exposed at the relative positions (relative positions for exposure) of a plurality of the photosensitive members 51, 52 different from the relative positions (relative positions in operation) with the photosensitive members 51, 52 arranged for integration after exposure.

Specifically, as shown in FIG. 6B, the relative position of the photosensitive member 51 nearer to the reference beam-side mirror 31 is changed in such a manner as to increase the angle $\theta_{H2}$ which the straight line connecting the forward end 313 of the reference beam-side mirror 31 and the upper end 511 of the photosensitive member 51 nearer to the reference beam-side mirror 31 forms with the normal to the photosensitive member 51. The photosensitive member 51 is arranged by being relocated downward in FIG. 6B.

According to this fabrication method, as shown in FIG. 6B, the upper photosensitive member 51 is exposed in such a manner that the incidence path of the reference beam 41 is relocated in parallel to the position defined in the first embodiment in accordance with the displacement of the relative position.

Also, as shown in FIG. 6A, the lower photosensitive member 52 is exposed in a similar way to the first embodiment. Regardless of which of the photosensitive members 51, 52 is exposed, the reference beam-side mirror 31 makes up the reference beam-side mirror 311 having a smaller length of extension (FIGS. 6A, 6B).

The other points are similar to the corresponding points in the first embodiment.

This fabrication method makes it possible to increase the angle $\theta_{H2}$ that the straight line connecting the forward end 313 of the reference beam-side mirror 31 and the upper end 511 of the photosensitive member 51 forms with the normal to the photosensitive member 51.

As a result, a hologram screen 500 having a large visual range can be fabricated.

The remaining points are similar to the corresponding points of functions and effects in the first embodiment.

Fourth Embodiment

This embodiment represents a case in which the visual angle $\theta_i$ ($\approx\theta_{H2}$) at the upper end portion 502 of the hologram screen 500 according to the third embodiment is measured.

FIG. 7 shows the relation between the position of the upper photosensitive member 51 and the visual angle $\theta_i$ ($\approx\theta_{H2}$) at the upper end portion 502 of the hologram screen 500.

Specifically, the relative position of the photosensitive member 51 for exposure which is set to a position identical with the relative position in operation is defined as a reference position. Then, the relation between the distance over which the photosensitive member 51 is relocated vertically downward of the reference position and the angle $\theta_{H2}$ is determined. The measurement is taken for the four moved distances including 0 mm, 50 mm, 100 mm and 150 mm.

The dimensions of the hologram imaging apparatus 1 used for this measurement are similar to those in the second embodiment.

As understood from FIG. 7, the angle $\theta_{H2}$ at the upper end portion 502 of the hologram screen 500 can be increased by increasing the moved distance described above. In other words, the visual angle $\theta_1$ can be increased in a similar way.

In fact, assuming that the moved distance is 150 mm, the visual angle $\theta_1$, has been determined at 14.3° using the white light in the reproduction optical system according to the first embodiment shown in FIG. 5. In comparison, the visual angle $\theta_i$ measured for the moved distance of 0 mm has been 8.1°.

This measurement shows that according to this embodiment, the visual angle $\theta_i$ at the upper end portion 502 of the hologram screen 500 can be successfully increased.

An excessively increased moved distance, however, would inappropriately change the color or reduce the brightness of the image or cause other inconveniences, and therefore the distance to be safely moved has its own limit.

Fifth Embodiment

Figure 8:
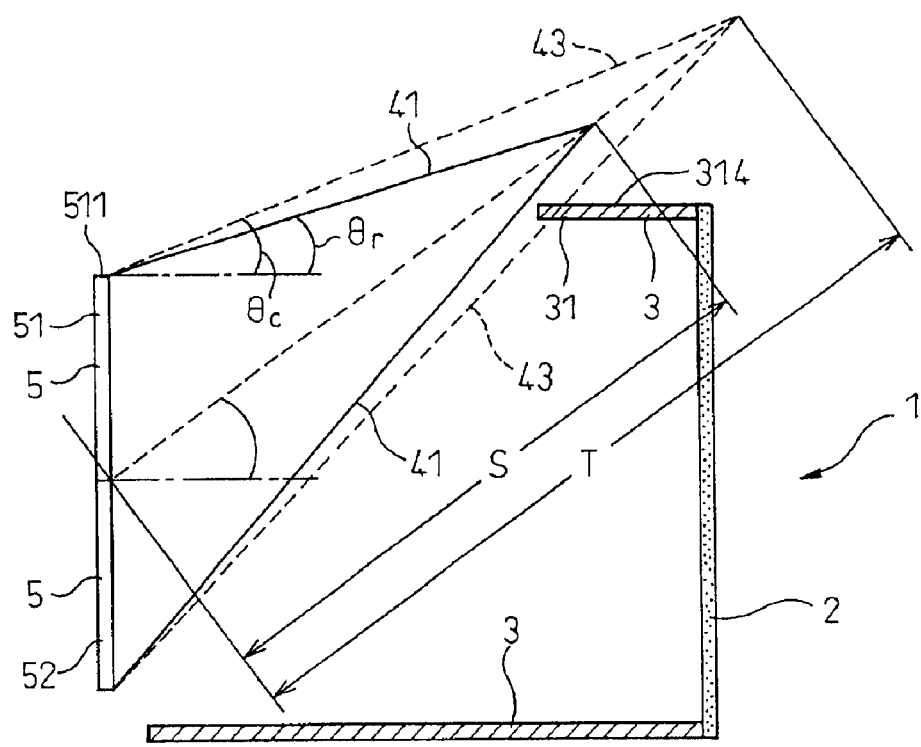
FIG. 8 is a diagram for explaining a method of fabricating a hologram screen according to a fifth embodiment of the invention.
Figure 9A:
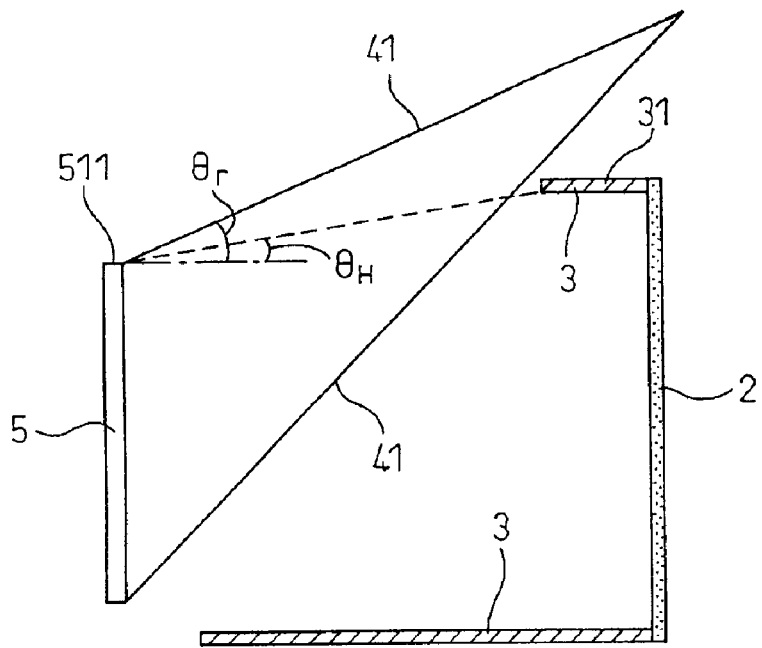
FIGS. 9A and 9B are diagrams for additionally explaining each parameter of the hologram imaging formula according to the fifth embodiment of the invention.
Figure 9B:
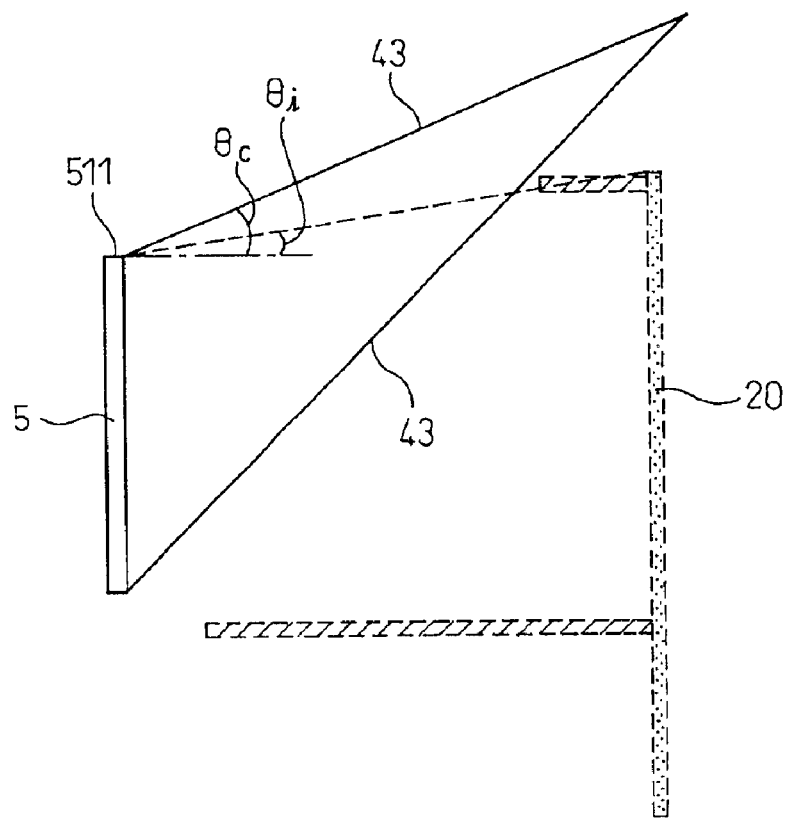

This embodiment represents, as shown in FIGS. 8, 9A, and 9B, a method of fabricating a hologram screen in which the distance S over which the reference beam 41 is projected is shortened as compared with the distance T over which the image light 43 is projected using the hologram screen.

Also, the reference beam-side mirror 314 according to this embodiment is longer than the reference beam-side mirror 311 (FIG. 1A) shown in the first embodiment and shorter than the reference beam-side mirror 312 (FIG. 1B). In exposing any one of the photosensitive members 5, the same reference beam-side mirror 314 is used.

The other points are similar to the corresponding points of the first embodiment.

As a result, the incident angle $\theta_r$ of the reference beam 41 to the end portion 511 of the photosensitive member 51 nearer to the reference beam 41 becomes smaller than the incident angle $\theta_c$ of the image light 43. As seen from the hologram imaging formula described above, therefore, the visual angle $\theta_i$ at the end portion of the hologram screen 500 nearer to the reference beam 41 is larger than in the case where the incident angle $\theta_r$ is equal to the incident angle $\theta_c$.

Thus, a hologram screen having a large visual range can be fabricated.

Specifically, the visual angle $\theta_i$ at the end portion of the hologram screen nearer to the reference beam can be generally calculated from the following "hologram imaging formula".

$$\theta_i = \sin^{-1}\{(\lambda_0/\lambda_c)(\sin\theta_H - \sin\theta_r) + \sin\theta_c\}$$

where, as shown in FIGS. 9A, 9B, $\lambda_0$ is the imaging wavelength (wavelength of the reference beam 41), $\lambda_c$ the wavelength of the image light 42, and $\theta_H$ the angle that the straight line connecting the upper end 511 of the photosensitive member 5 and the forward end 313 of the reference beam-side mirror 31 forms with the normal to the photosensitive member 5.

The other functions and effects are similar to the corresponding ones of the first embodiment.

The method of fabricating a hologram screen according to this embodiment can be combined with the method according to the first embodiment or the third embodiment. Specifically, in exposing the upper photosensitive member, the length by which the reference beam-side mirror extends is increased while at the same time reducing the distance over which the reference beam is projected. As an alternative, in exposing the upper photosensitive member, the relative distance of the reference beam for exposure can be replaced with the relative distance thereof in operation, while at the same time reducing the distance over which the reference beam is projected.

As a result, the visual angle of the hologram screen can be further increased.

Also, according to this embodiment, the same effects can be achieved by fabricating a hologram screen by exposing a undivided single photosensitive member once.

Sixth Embodiment

Figure 10A:
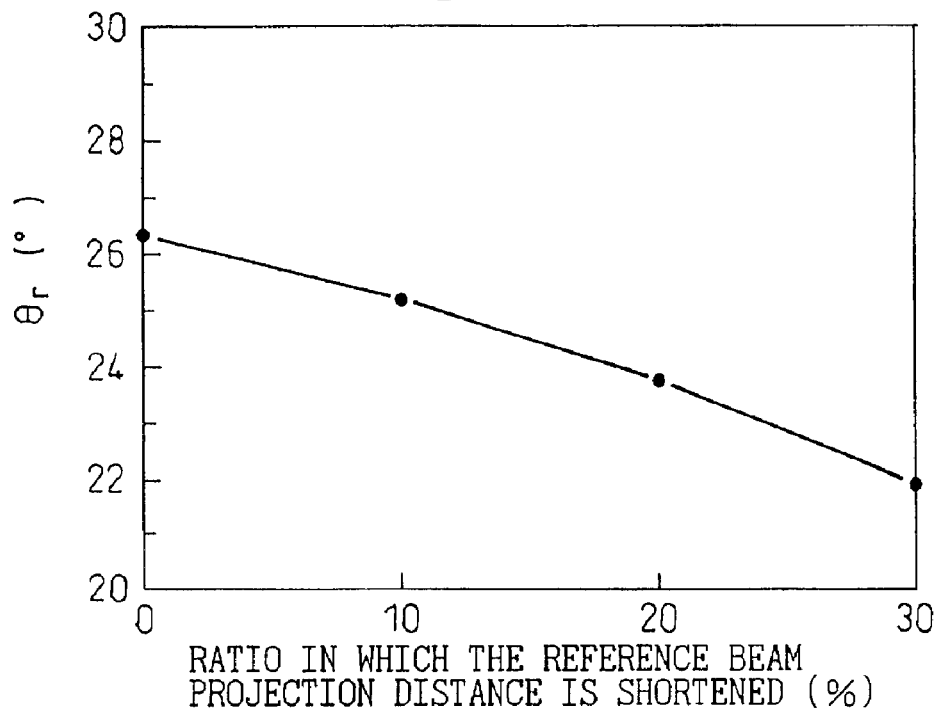
FIG. 10A is a diagram showing the result of measuring the incident angle $\theta_r$ of the reference beam to the upper end portion of the photosensitive member, and FIG. 10B a diagram showing the result of measuring the visual angle $\theta_l$.
Figure 10B:
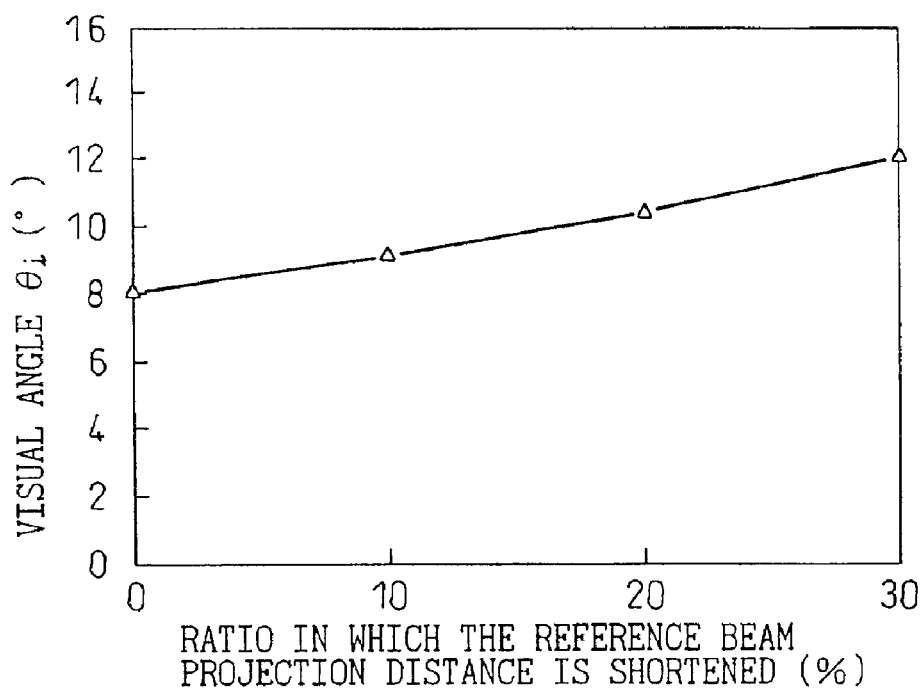

This embodiment represents a case in which the visual angle $\theta_I$ at the upper end portion 502 of the hologram screen 500 fabricated according to the first and fifth embodiments combined is measured, as shown in FIGS. 10A, 10B. Specifically, the hologram screen 500 is fabricated by increasing the length of extension of the reference beam-side mirror 31 (FIG. 1B), while at the same time reducing the distance S over which the reference beam 41 is projected (FIG. 8) when exposing the upper photosensitive member 51.

First, the relation is determined by measurement between the ratio at which the projection distance S of the reference beam is reduced with respect to the image light projection distance T and the incident angle $\theta_r$ (FIG. 8) of the reference beam 41 to the upper end portion 512 of the photosensitive member 5 (FIG. 10A).

Then, the relation is studied between the ratio at which the reference beam projection distance S is reduced with respect to the image light projection distance T and the visual angle $\theta_i$ at the upper end portion 502 of the hologram screen 500 (FIG. 10B).

The dimensions of the hologram imaging apparatus using the measurements described above are similar to those of the second embodiment.

As seen from FIGS. 10A, 10B, as the result of reducing the projection distance S of the reference beam 41, the visual angle $\theta_I$ increases with the decrease in the incident angle $\theta_r$. It is also seen that in the case where the reference beam projection distance is 20% shorter than the projection distance T of the image light 43, it is possible to secure the visual angle $\theta_i$ of about double the visual angle $\theta_i$ (=5.5°) of the conventional hologram screen.

This fact can be predicted also from the hologram imaging formula described above.

Thus, it is understood that according to this embodiment, a hologram screen having a still larger visual range can be fabricated by combining the first and fifth embodiments.

Seventh Embodiment

Figure 11:
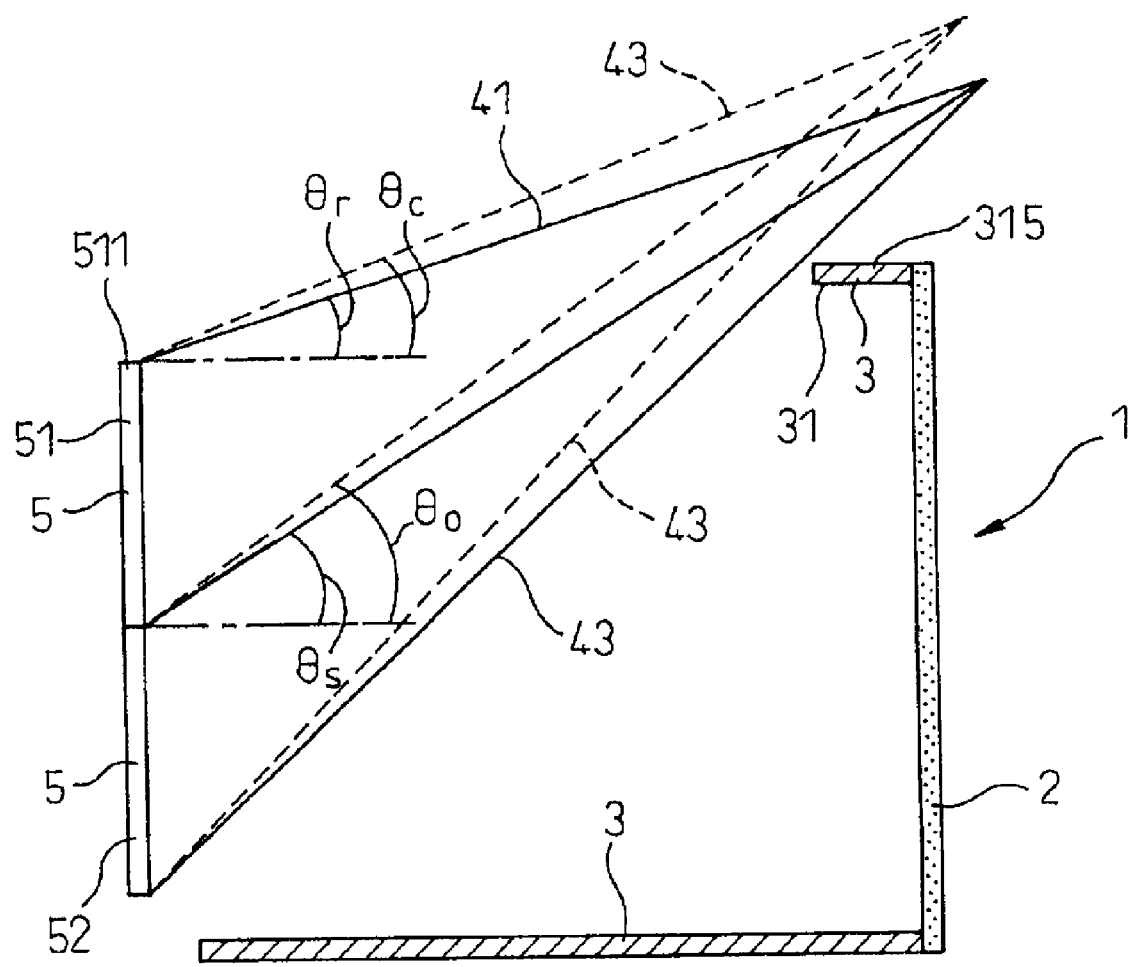
FIG. 11 is a diagram for explaining a method of fabricating a hologram screen according to a seventh embodiment of the invention.

This embodiment represents a method of fabricating a hologram screen in which the projection angle $\theta_s$ of the reference beam 41 is set to a value smaller than the projection angle $\theta_0$ of the image light 43 for the hologram screen 500 in operation, as shown in FIG. 11.

In this embodiment, the reference beam-side mirror 315 has a still smaller length of extension than the reference beam-side mirror 311 (FIG. 1A) of the first embodiment.

Regardless of which of the photosensitive members 5 is exposed, the same reference beam-side mirror 315 is used.

The remaining points are similar to the corresponding points of the first embodiment.

In this case, too, as in the fifth embodiment, the incident angle $\theta_r$ of the reference beam 41 to the upper end portion 512 of the photosensitive member 51 is smaller than the incident angle $\theta_c$ of the image light 43. As a result, as apparent from the hologram imaging formula, the visual angle $\theta_i$ at the upper end portion 502 of the hologram screen 500 is larger than in the case where the incident angle $\theta_r$ is equal to the incident angle $\theta_c$.

Thus, a hologram screen having a large visual range can be positively fabricated.

Eighth Embodiment

Figure 12:
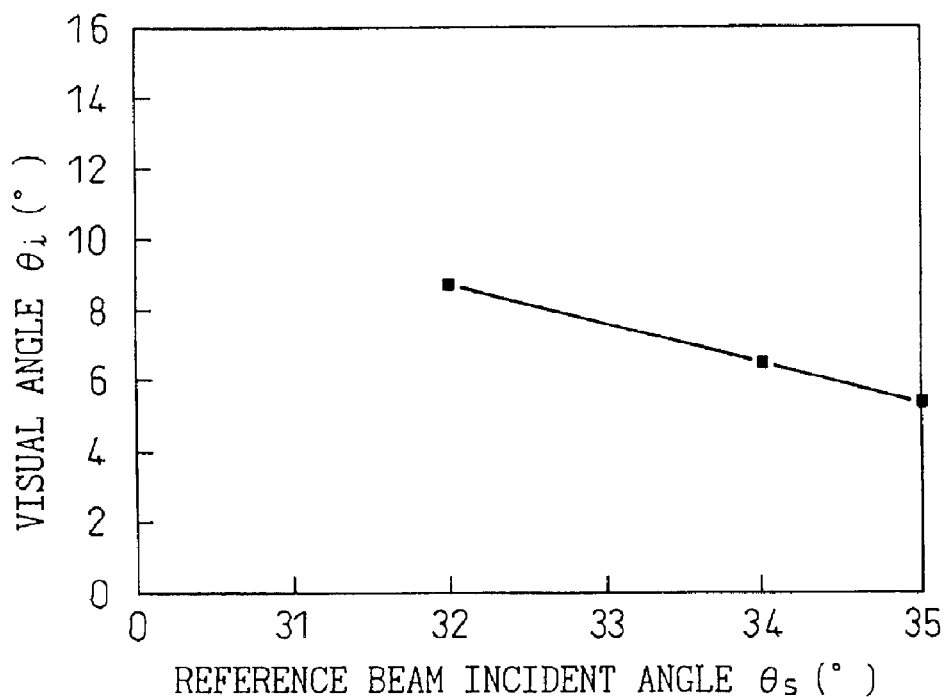
FIG. 12 is a diagram showing the relation between the incident angle $\theta_s$ of the reference beam and the visual angle $\theta_l$ according to an eighth embodiment of the invention.

This embodiment represents a case in which, as shown in FIG. 12, the visual angle $\theta_I$ at the upper end portion 502 of the hologram screen 500 according to the seventh embodiment is measured.

Specifically, the relation between the incident angle $\theta_s$ of the reference beam 41 and the visual angle $\theta_i$ is determined by measurement. The incident angle $\theta_s$ of the reference beam 41 is the one at the upper end of the lower photosensitive member 52 at the lower end of the upper photosensitive member 51. The dimensions of the hologram imaging apparatus used for this measurement are similar to the corresponding dimensions of the second embodiment, except for the reference beam-side mirror 315.

The result of measurement is shown in FIG. 12.

As understood from FIG. 12, the visual angle $\theta_i$ at the upper end portion of the hologram screen can be increased by reducing the incident angle $\theta_s$.

Ninth Embodiment

Figure 13:
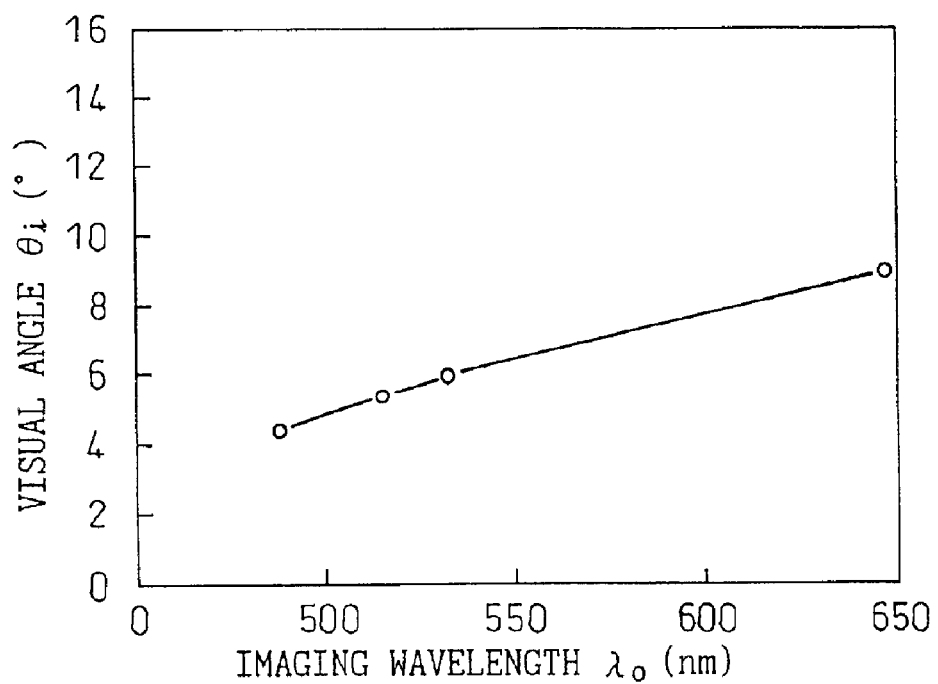
FIG. 13 is a diagram showing the relation between the imaging wavelength $\lambda_0$ and the visual angle $\theta_l$ according to a ninth embodiment of the invention.

This embodiment represents a case in which, as shown in FIG. 13, the visual angle $\theta_I$ at the upper end portion of the hologram screen is measured while changing the imaging wavelength $\lambda_O$.

Specifically, the visual angle $\theta_I$ is measured for each of the hologram screens fabricated using the four different imaging wavelengths $\lambda_O$ (wavelengths of the object beams and the reference beam) of 488 nm, 514 nm, 532 nm and 647 nm.

The other points are similar to the corresponding points of the conventional exposure optical system.

The measurements obtained are shown in FIG. 13. As understood from FIG. 13, the visual angle $\theta_i$ can be increased by lengthening the imaging wavelength $\lambda_O$.

This is also indicated by the hologram imaging formula described above.

In this way, a hologram screen having a large visual range can be fabricated by using a laser of a wavelength longer than 488 nm or 514 nm which are the figures for the conventional Ar laser.

A hologram screen having a still larger visual range can be fabricated by combining the fabrication method according to this embodiment with the fabrication methods according to the first, third, fifth and seventh embodiments.

In each of the embodiments described above, the reference beam is radiated on the photosensitive members obliquely from an upper position. The direction in which the reference beam is radiated, however, is not specifically limited, but the same functions and effects can be achieved by radiating the reference beam from an obliquely lower position or obliquely sideways in respective applications of the invention.

What is claimed is:

1. A method of fabricating a hologram screen, comprising:

preparing a plurality of mirrors to be arranged at an end portion of a light diffuser and to be arranged at a side of a light source of a reference beam, each of said plurality of mirrors being extended toward each of a plurality of photosensitive members, respectively, such that a reference beam generated from the light source reaches said each of said plurality of photosensitive members without being shielded by said each of said plurality of mirrors;

forming a plurality of holograms by successively exposing said each of said plurality of photosensitive members individually using said reference beam and a plurality of object beams passed through said light diffuser; and two-dimensionally arranging and integrating a plurality of said holograms thereby to form a hologram screen, wherein, in said successively exposing said each of said plurality of photosensitive members, one of said plurality of mirrors is replaced with another of said plurality of mirrors having a different length of extension from said light diffuser in accordance with the position of said each of the plurality of photosensitive members to be exposed individually thereby to expose said each of the plurality of photosensitive members without being shielded by the each of the plurality of mirrors.

2. A method of fabricating a hologram screen according to claim 1, wherein a length of extension by which said each of said plurality of mirrors extends toward said each of said plurality of photosensitive members is set to a larger value when exposing one of said plurality of photosensitive members arranged nearer to the light source of said reference beam than when exposing another of said plurality of photosensitive members arranged farther from the light source of said reference beam.

3. A hologram imaging apparatus for successively exposing a plurality of photosensitive members when fabricating a hologram screen by radiating at least a reference beam generated from a light source and a plurality of object beams passed through a light diffuser individually on said plurality of said photosensitive members, respectively, thereby to form a plurality of holograms, which are arranged and integrated with each other into a hologram screen, the apparatus comprising:

means for successively holding said plurality of photosensitive members at positions corresponding to the positions for subsequent arrangement and integration; and a plurality of mirrors to be successively arranged to extend toward said plurality of photosensitive members at an end portion of said light diffuser and to be arranged at a side of the light source such that a reference beam generated from the light source is not shielded by successive ones of said plurality of mirrors when each of said successive ones are arranged at said end portion of said light diffuser;

wherein one of said plurality of mirrors is replaced with another of said plurality of mirrors having a different length of extension from said light diffuser in accordance with a position of each of said plurality of photosensitive members to be exposed individually thereby to expose one of said plurality of photosensitive members.

4. A hologram imaging apparatus according to claim 3, wherein a length of extension of said one of said plurality of mirrors is set to a larger value when exposing said one of said plurality of photosensitive members arranged nearer to the light source of said reference beam than when exposing another of said plurality of photosensitive members arranged farther from the light source of said reference beam.

* * * * *